No. 844,939. PATENTED FEB. 19, 1907.
Z. S. HOFFMAN.
CANDY MACHINE.
APPLICATION FILED APR. 21, 1906.
2 SHEETS—SHEET 1.
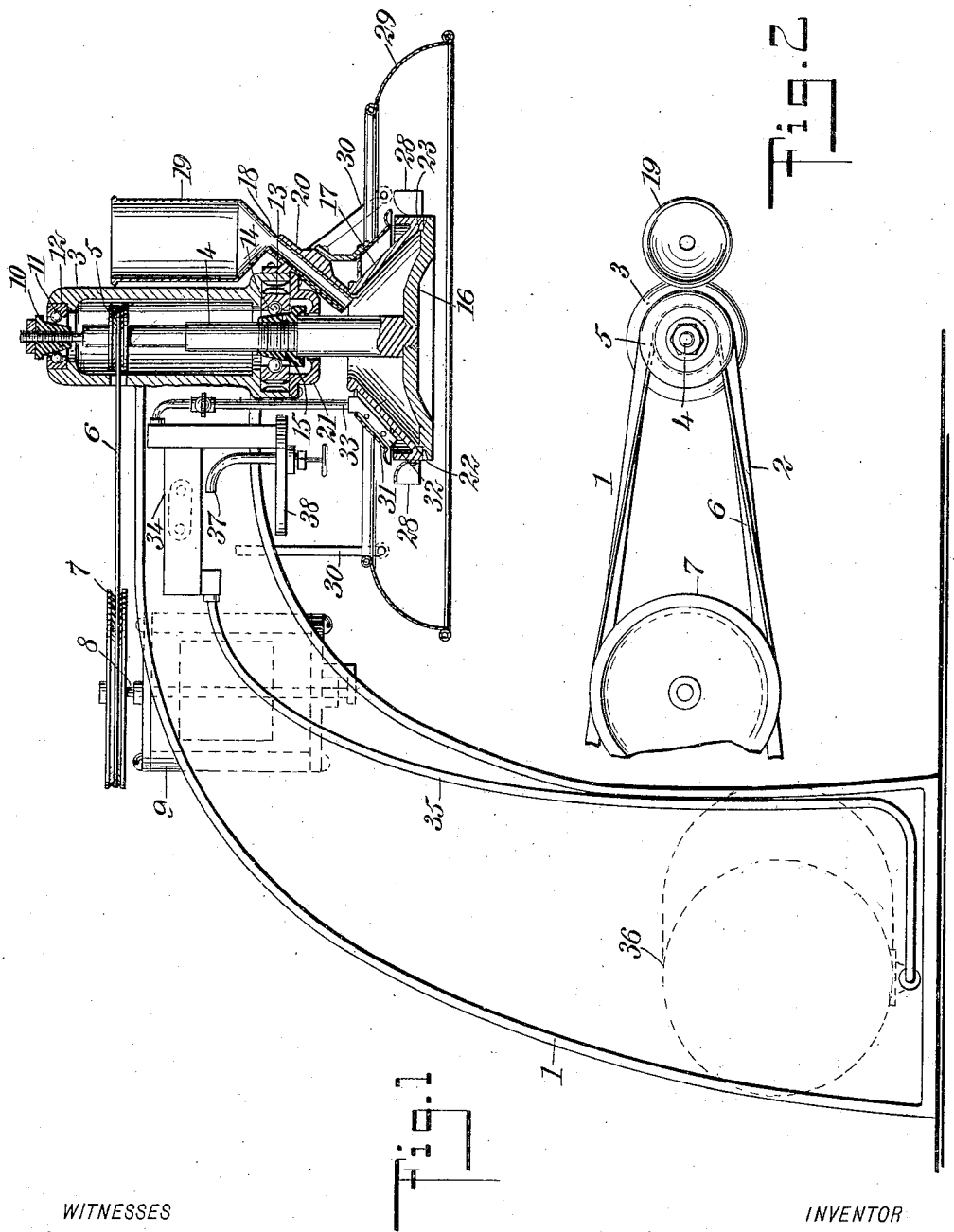
WITNESSES
INVENTOR
Zachariah S. Hoffman
BY
ATTORNEYS No. 844,939. PATENTED FEB. 19, 1907.
Z. S. HOFFMAN.
CANDY MACHINE.
APPLICATION FILED APR. 21, 1906.
2 SHEETS—SHEET 2.
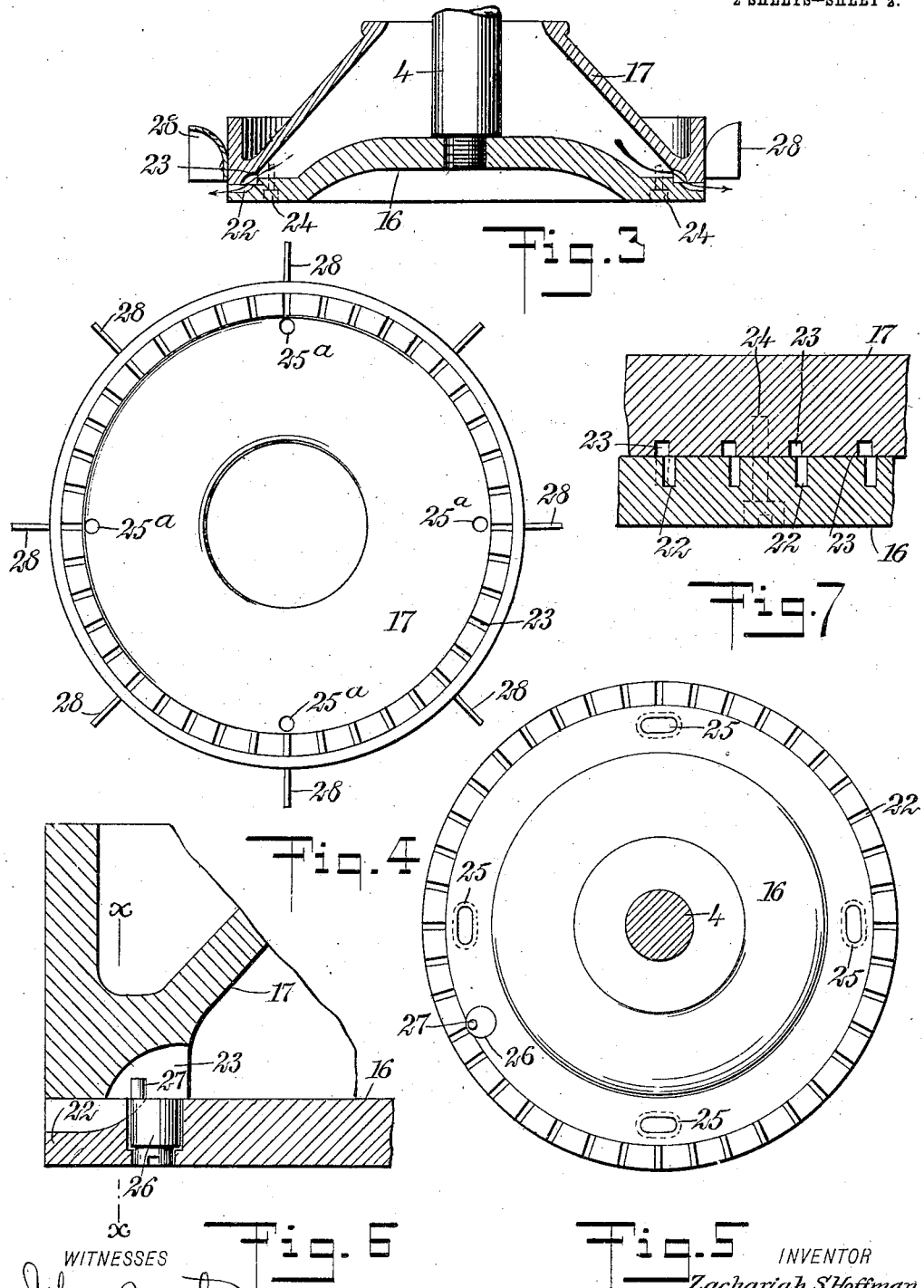
WITNESSES
INVENTOR
Zachariah S. Hoffman
BY Munn & Co
ATTORNEYS

UNITED STATES PATENT OFFICE.

ZACHARIAH S. HOFFMAN, OF NEWARK, NEW JERSEY.

CANDY-MACHINE.

No. 844,939.      Specification of Letters Patent.      Patented Feb. 19, 1907.

Application filed April 21, 1906. Serial No. 312,995.

*To all whom it may concern:*

Be it known that I, ZACHARIAH S. HOFFMAN, a citizen of the United States, and a resident of Newark, in the county of Essex and State of New Jersey, have invented a new and Improved Candy-Machine, of which the following is a full, clear, and exact description.

This invention relates to improvements in candy-machines of the type operating centrifugally to force out the melted sugar or other candy material in shreds or of a floss-like nature, the main object being to so construct the candy-head that the outlet may be readily adjusted as to size, thus providing for various sizes of shreds.

Other objects of the invention will appear in the general description.

I will describe a candy-machine embodying my invention and then point out the novel features in the appended claims.

Reference is to be had to the accompanying drawings, forming a part of this specification, in which similar characters of reference indicate corresponding parts in all the figures.

Figure 1 is an elevation, partly in section, of a candy-machine embodying my invention. Fig. 2 is a detail plan illustrating the driving mechanism. Fig. 3 is a sectional view of the candy-head. Fig. 4 is an interior view of the upper portion of the head. Fig. 5 is a plan of the lower portion thereof. Fig. 6 is a sectional detail showing an adjusting device employed, and Fig. 7 is a section on line $x\ x$ of Fig. 6.

Referring to the drawings, 1 designates the supporting-arm of the machine, which, as indicated in Fig. 2, is curved or has an overhanging upper portion and is made in the form of a frame 2, and supported in this frame member is a casing 3 for supporting the vertical spindle 4, on which is a band-pulley 5, having its band 6 engaging with a driving-wheel 7, which may be operated in any desired manner.

I have here shown the band-wheel 7 as connected to the spindle 8 of an electric motor 9, supported in the frame-like member of the arm 1.

Connected to the upper portion of the spindle 4 is a cone-shaped bearing 10, which engages with ball-bearings 11 in a raceway 12, secured in the upper portion of the casing 3, and secured in the lower portion of the casing 3 is a raceway 13, supporting antifriction-balls 14, which engage with a cone-bearing 15 on the spindle.

The candy-head comprises a lower disk-like member 16, secured to the lower end of the spindle 4, and an upper shell-like member 17, which is practically in the form of a truncated cone open at the top to receive sugar discharged from a spout 18, leading from the sugar-reservoir 19, the said reservoir being supported by a bracket 20, attached to the casing 3. Also attached to the lower end of the casing and surrounding the bracket 20 is an oil-cup 21.

At its edge the lower member 16 of the candy-head is provided with outwardly-opening slots 22, and the lower edge of the upper member 17 is also provided with radial slots 23, which open outward, the upper walls of said slots 23 being curved downward and outward, while the lower walls of the slots 22 are curved downward and outward, and the outer ends of the slots 23 slightly overlap the inner ends of the slots 22, as clearly indicated in Fig. 6.

The upper member 17 of the head has a slight rotary adjustment relatively to the member 16, so that the degree of opening may be regulated. As here shown, fastening-screws 24 pass through slots 25, formed in the lower member 16, and engage in tapped holes 25$^a$ in the upper member 17. As a means for causing the adjustment I here show a plug 26, mounted to rotate in the lower member 16 and having an eccentric-pin 27, which passes into one of the slots 23.

By rotating the plug 26 by means of a suitable instrument it is obvious that the pin 27, by engaging with a wall of the slot into which it extends, will cause a rotary movement of the upper section or member 17.

Secured to the periphery of the candy-head are fan-blades 28, which are designed to force the spun candy downward, and as a further means for forcing the candy downward I employ a fixed guard-plate 29, which is in the form of a ring and dished downward, and it is supported by means of hangers 30.

Rigidly supported around the upper section 17 of the candy-head and spaced therefrom is a head 31, in which is arranged a gasolene-burner 32, designed for heating and melting the sugar in the candy-head. It is to be understood, however, that I do not confine the heating device to a gasolene-burner. The burner communicates through a pipe 33 with a gas and air mixing casing 34, having a pipe connection 35 with a gasolene-tank, (indicated by the dotted lines 36.) In first starting the burner the gasolene is heated by a flame derived from a tube 37, extended upward from a pan 38.

In the operation the sugar or other candy material passes from the receptacle 19 through the spout 18 into the candy-head, where it is melted by the heating device. As the head rapidly rotates, the liquid material is forced out by centrifugal action through the slots in the form of fine shreds.

Having thus described my invention, I claim as new and desire to secure by Letters Patent—

1. In a candy-machine, a supporting-arm having an overhanging upper portion and a casing arranged in the said supporting-arm, a spindle mounted to rotate in said casing, and a candy-head carried on the lower end of the spindle, the said head having peripheral outlets.

2. A candy-machine comprising a supporting-arm, a casing attached thereto, and a spindle vertically arranged in the casing.

3. In a candy-machine, a supporting-arm having an overhanging upper portion, a casing arranged in said arm, a spindle mounted to rotate in the casing, ball-bearings for said spindle, a candy-head carried by the lower end of said spindle and having peripheral openings, the said head being open at the top, and means for directing sugar or the like into said head.

In testimony whereof I have signed my name to this specification in the presence of two subscribing witnesses.

ZACHARIAH S. HOFFMAN.

Witnesses:
SAMUEL F. FOSTER,
WILLIAM J. FISH.